United States Patent [19]
Gjullin

[11] Patent Number: 6,005,581
[45] Date of Patent: Dec. 21, 1999

[54] TERRAIN ELEVATION PATH MANAGER

[75] Inventor: Robert M. Gjullin, Corrales, N.Mex.

[73] Assignee: Honeywell, Inc., Minneapolis, Minn.

[21] Appl. No.: 08/183,531

[22] Filed: Jan. 18, 1994

[51] Int. Cl.$^6$ ........................................... G06T 15/00
[52] U.S. Cl. ........................................ 345/430; 345/425
[58] Field of Search .................... 395/121, 123, 395/127, 125, 130; 342/64; 364/443, 447, 457; 345/430, 423, 421, 427, 425

[56] References Cited

U.S. PATENT DOCUMENTS

| | | | |
|---|---|---|---|
| 4,024,539 | 5/1977 | Quinlivan et al. | 342/179 |
| 4,347,511 | 8/1982 | Hofmann et al. | 342/64 |
| 4,467,429 | 8/1984 | Kendig | 364/433 |
| 4,584,646 | 4/1986 | Chan et al. | 364/449 |
| 4,682,160 | 7/1987 | Beckwith, Jr. et al. | 395/121 |
| 4,802,757 | 2/1989 | Pleitner et al. | 364/456 |
| 4,805,108 | 2/1989 | Feuerstein et al. | 364/433 |
| 4,827,252 | 5/1989 | Busbridge et al. | 395/125 |
| 4,910,674 | 3/1990 | Lerche | 364/443 |
| 4,916,448 | 4/1990 | Thor | 340/970 |
| 5,047,777 | 9/1991 | Metzdorff et al. | 342/64 |
| 5,087,916 | 2/1992 | Metzdorff et al. | 342/64 |
| 5,104,217 | 4/1992 | Pleitner et al. | 364/456 |
| 5,136,512 | 8/1992 | Le Borne | 364/461 |
| 5,272,639 | 12/1993 | McGuffin | 364/449 |

*Primary Examiner*—Stephen S. Hong
*Attorney, Agent, or Firm*—Andrew A. Abeyta; Kenneth J. Johnson

[57] ABSTRACT

A terrain profile for executing terrain following flight is generated using a minimal volume of digital terrain elevation data (DTED) information. By limiting the amount of information considered in generating the terrain profile, the computational time and resource requirements for terrain profile generation are reduced, but without compromising the integrity of the terrain profile generated. The sample region is limited by limiting the width of sample regions according to expected use including most likely terrain following flight command data, potential unexpected flight path deviation, and long range terrain following flight data.

3 Claims, 2 Drawing Sheets

TERRAIN ELEVATION PATH MANAGER

GOVERNMENT RIGHTS

The Government has rights in this invention pursuant to Contract No. F33600-88-G-5107, awarded by the Department of the Air Force.

BACKGROUND OF THE INVENTION

The present invention relates generally to terrain following aircraft control, and more particularly to a method for accessing and utilizing terrain elevation data in the context of terrain following flight.

To minimize above ground elevation, and therefore minimize visibility and vulnerability to ground based detection and attack, military aircraft often execute terrain following flight. Terrain following flight generally maintains a given elevation above ground level independent of actual elevation above sea level. In other words, the aircraft follows the ground contour at a substantially fixed elevation above the ground and maneuvers according to prevailing ground contour along a given flight path. The actual above ground level elevation may increase to establish a suitable climb angle to clear an upcoming high elevation terrain feature.

The general algorithm applied to flight following terrain is to select the tallest terrain feature lying along and near the flight path. The aircraft altitude and attitude vector are referenced to determine whether or not an upcoming terrain feature will be cleared. If necessary, the terrain following algorithm requires that the aircraft enter a suitable climb angle to clear any upcoming terrain features. Otherwise, the algorithm would maintain a substantially consistent above ground elevation according to a given terrain profile data structure.

As used herein, the term "terrain profile" shall refer to a data structure representing terrain along a given flight path. A terrain following algorithm uses the terrain profile data structure to execute terrain following flight along the designated flight path. A terrain profile may be thought of generally as a terrain cross-sectional, elevational contour, e.g., as taken through a vertical plane containing the flight path, but must account for terrain conditions near the designated flight path. For example, for a given point along the flight path, the highest elevation point laterally outward on either side a given distance is assigned as the terrain profile elevation at the given point. This produces a conservative, i.e., safe, elevation contour in the terrain profile.

Most terrain following applications use radar and/or ladar sensor data to generate a terrain profile along a predicted flight path of the aircraft. The predicted flight path is generally based on the current aircraft attitude and velocity. Terrain following flight is preferably executed, however, with limited or no active sensor data because active sensor emissions make the aircraft visible to threat installations at greater distances. Using active sensors, especially at high power, compromises covert missions because the aircraft can be detected at long distances by hostile forces. If active sensors are to be used, such sensors are preferably used at low power settings to minimize detectable emissions and allow only short range detection by hostile forces. Unfortunately, terrain following flight requires more distant terrain information, typically exposing the aircraft to detection if generated using long range high power active sensors. Furthermore, active sensor data has its limitations. Sensor data alone cannot see behind hills or around corners. Sensors can only "guess" where to gather terrain data in generating a terrain profile.

Digital terrain elevation data represents surface elevation at discrete "data posts." Each data post has a surface location or address, e.g. latitude and longitude, and an associated elevation, e.g. relative to sea level. Thus, a simple form of a DTED database would deliver a scalar elevation datum in response to longitude and latitude address input. More complicated DTED databases have been developed for certain applications. For example U.S. Pat. No. 4,899,293 issued Feb. 6, 1990 to J. F. Dawson and E. W. Ronish shows a tessellation method for creating a spherical database by warping a digital map, including digital terrain elevation data, by longitude and latitude parameters.

DTED database systems are used in flight mission computer systems and flight planning strategy in military applications aid in, for example, covert and evasive flight operations. As used in mission computer systems, a DTED database can aid a pilot in time-critical maneuvers such as terrain following flight or in selecting routes evasive with respect to a given threat position. Such threat positions may be known in advance, or detected while in flight. The computation speed required in accessing and calculating routes or alternatives based on DTED can be vitally critical, especially for repeated computations required to keep a pilot fully appraised of current terrain conditions and route alternatives. Thus, improvements in methods of accessing DTED and computations based on extracted DTED are not simply improvements in computational elegance, but can be life-saving and critical to mission success.

Terrain profiles have been built by extracting a massive volume of DTED data with reference to a designated flight path. As may be appreciated, each data sample taken from the DTED database for consideration in generating the terrain profile requires a given amount of processing time. The data extracted from the DTED database for generating the terrain profile corresponded to data posts lying along a length of the flight path preceding aircraft position and all data posts within a given distance of that length portion, i.e. a fixed length and width region of data posts along the flight path and identified relative to current aircraft position. The terrain profile must provide safe, conservative information. To this end, a large volume of DTED data has been incorporated into terrain profiles. Unfortunately, the volume of data extracted and processed has constrained terrain profile generation, i.e., has required excess terrain profile calculation time.

Thus, prior methods of generating terrain profiles include long range active sensors, but long range sensor emissions make aircraft visible at long distances, and DTED database systems, but generating conservative terrain profiles requires massive DTED data points and can require relatively long calculation time.

It is desirable, therefore, that terrain following flight be executed without aid of high power, long range active sensor data to avoid exposing the aircraft to threat installations. It is further desirable that a method of producing a terrain profile for executing terrain following flight support dynamic and efficient calculation time.

SUMMARY OF THE INVENTION

In accordance with the present invention, an aircraft flight path is selected and a limited volume of DTED data points are extracted from a DTED database to safely minimize the above ground level elevation at any given point during the terrain following flight. More particularly, the DTED data points extracted from the database are taken from sample regions having dimension according to conditions such as time and distance relative to the aircraft.

In accordance with a preferred embodiment of the present invention, each sample region is centered upon the selected flight path and positioned relative to the aircraft, but varies in width relative to other sample regions. Generally, the wider sample regions are near the aircraft, and sample regions more distant from the aircraft along the selected flight path become increasing more narrow. The widest sample region corresponds to a portion of the flight path, at a given position relative to the aircraft, associated with potential aircraft flight path deviation. Thus, additional terrain data is considered in the event of such unexpected deviation from the terrain following flight path. In this manner, a relatively greater volume of DTED data is extracted as needed. More distant terrain along the flight path is suitably evaluated, but using a lesser volume of DTED data. As a result, computational throughput and memory requirements for terrain following flight algorithms are minimized while maximizing terrain following performance and safety criteria.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
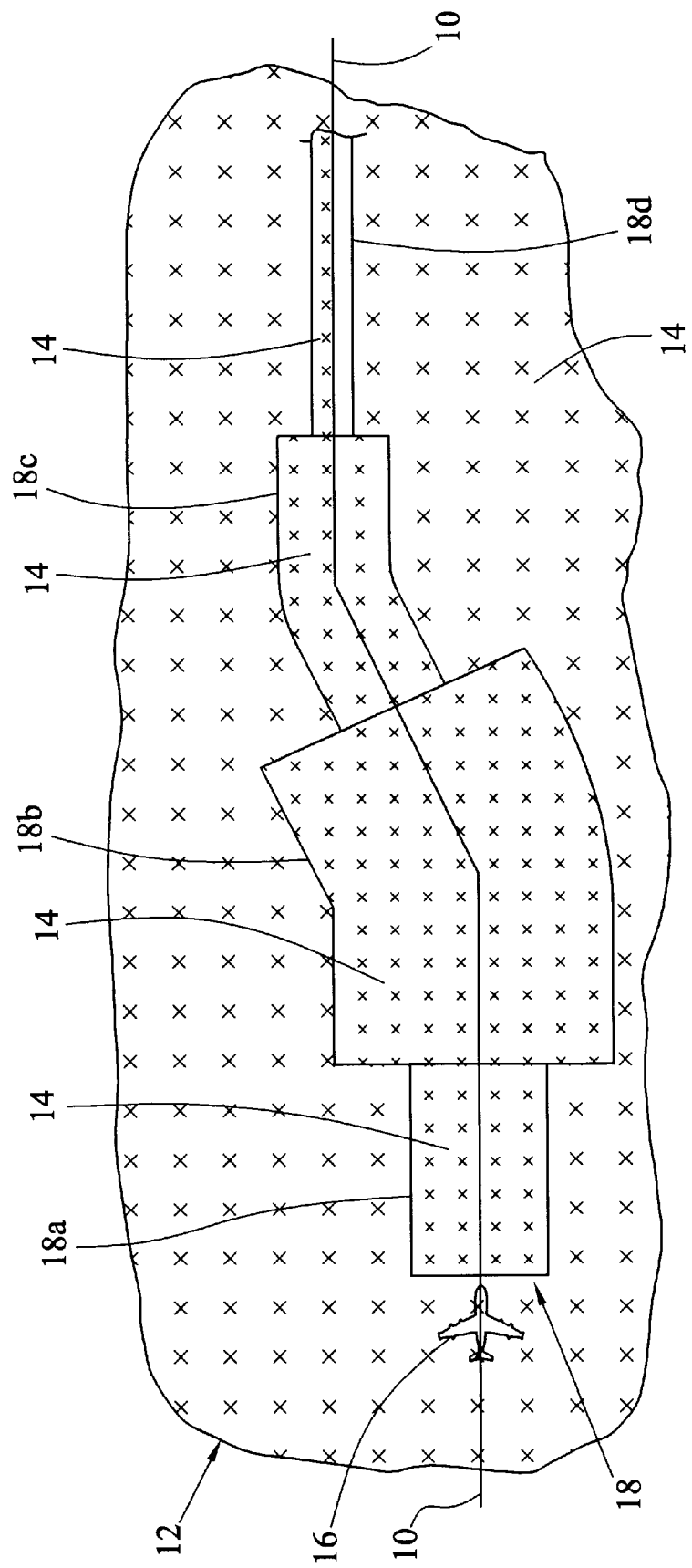
FIG. 1 illustrates in plan view a sample region taken from a DTED database in accordance with the present invention for generating a terrain profile to aid in terrain following flight.

FIG. 1 illustrates a flight path 10 with reference to a portion of a digital terrain elevation data (DTED) database 12 comprising a grid of data posts 14. Each data post 14 is indicated in FIG. 1 as an "X", but no scale in data post 14 spacing is indicated nor is every data post 14 shown. DTED database 12 may take a variety of formats, but as relevant to the present invention may be taken generally as an XY addressable array of data posts 14, e.g., addressed by latitude and longitude, and providing elevation at a given location. The flight path 12 may be a flight path selected as part of a mission plan, or may be a flight path predicted dynamically as a function of the current aircraft attitude and velocity vectors. In either case, it is necessary to extract from the DTED database 12 elevation data relative to flight path 10 to generate a terrain profile in aid of terrain following flight therealong.

Terrain following flight is executed in accordance with the present invention by reference to the DTED database 12 with little or no additional active sensor data. Any active sensors used would be at low power and detectable only within several nautical miles of the aircraft. It is desirable to execute such terrain following flight with a minimum above ground level elevation to minimize the aircraft visibility and vulnerability to attack from threat installations. Using a terrain profile based on DTED information, the aircraft can achieve such minimum above ground level elevation by anticipating upcoming terrain conditions and minimizing above ground level elevation with respect to such anticipated terrain conditions taking into account aircraft and pilot flight capabilities and reaction times.

As may be appreciated, a DTED database can be huge and computationally burdensome to analyze in its entirety, especially while dynamically executing terrain following flight. In accordance with the present invention, however, only a limited portion of database 12 need be extracted, i.e., sample region 18, for use in generating a terrain profile for executing terrain following flight. This minimizes the computation and memory requirements of such terrain following flight. The sample region 18 includes a set of subregions 18a–18d each selected dynamically as a function of aircraft 16 position along flight path 10.

A short-term profile subregion 18a exists along flight path 10 beginning at and extending approximately 2 nautical miles in front of aircraft 16. The width of short-term profile subregion 18a may vary while in flight as a function of aircraft NAV CEP, cross track deviation, and aircraft 16 wingspan. This restricts fine adjustments of the terrain profile obtained to the region of database 12 from which most terrain following steering commands are most likely generated, i.e., the horizon to clear is typically within 2 nautical miles of the aircraft 16.

A first mid-term profile subregion 18b, beginning at approximately 2 nautical miles in front of aircraft 16 along flight path 10 and terminating at approximately 5 nautical miles from aircraft 16, is relatively wider than that of short-term subregion 18a. The width of mid-term subregion 18b may be a constant width, but defined as a function of potential forces or conditions acting to drive the aircraft 16 off the selected or predicted flight path 10. Thus, to the extent that aircraft 16 may deviate from path 10, region 18b should be suitably wide enough to anticipate flight within this range of potential deviation. The type of forces considered in establishing a width for mid-term subregion 18b can be generally characterized as unpredicted conditions. For example, a sudden, unexpected sidewind may drive the aircraft off the flight path 10, or an unforeseen event may distract the pilot and the aircraft might deviate to some extent relative to flight path 10. Thus, in establishing the width of mid-term subregion 18b, a variety of potential path deviating conditions may be considered. Also, the width calculation should take into account specific information such as pilot response time to unpredicted events and the specific aircraft used, i.e., aircraft response to pilot commands. For example, a fast aircraft having relatively slow ground track response may require a relatively wider subregion 18b due to the relatively greater distance the aircraft could potentially deviate from flight path 10 due to its speed and relatively slow ground track response. In contrast, a slow, large aircraft may have fast ground track response and permit a relatively more narrow subregion 18b.

A second mid-term subregion 18c, beginning at approximately 5 nautical miles along flight path from aircraft 16 and terminating at approximately 7 nautical miles along flight path 10 relative to aircraft 16, is relatively more narrow than that of subregion 18b. It is assumed that the pilot will steer back onto path 10 in response to any path deviating forces detected in region 20 and thereby have the advantage of early consideration of the subregion 18c.

A long-term profile subregion 18d, beginning approximately 7 nautical miles along flight path 10 relative to aircraft 16 to approximately 20 nautical miles along flight path 10 relative to aircraft 16, is the most narrow portion of region 18. The width of subregion 18d may be a single data post 14 such that major terrain variation directly along path 10 may be considered well in advance.

Figure 2:
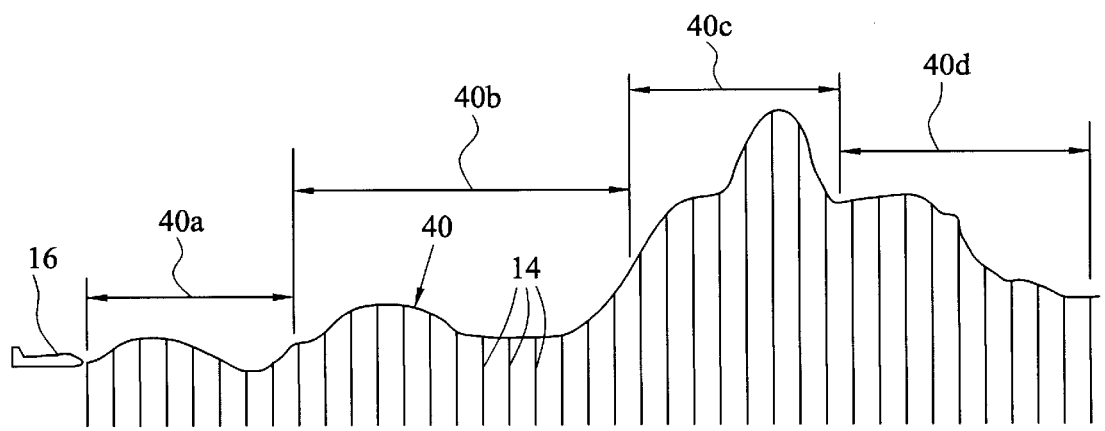
FIG. 2 illustrates a terrain profile generated from the sample region of FIG. 1.

FIG. 2 illustrates a terrain profile 40 generated from region 18. Profile section 40a corresponds to flight path 10 within subregion 18a, section 40b within subregion 18b, section 40c within subregion 18c, and section 40d within subregion 18d. The method of transforming sample region 18 into terrain profile 40 may take a variety of forms. Under any such method of converting sample region 18 into terrain profile 40, however, it is assumed that the computational time and resources required are a function of the number of data posts considered. Thus, because the method of analysis under the present invention allows generation of an acceptable, i.e., safe or conservative, terrain profile based on a relatively smaller volume of DTED data, the method of the present invention offers an advantage in lesser computational time and resource requirements while maintaining strict safety criteria.

Under the present invention, the volume of DTED database 12 data gathered and analyzed is minimized according to its use. The subregion 18a accounts for that portion of database 12 necessary for executing most terrain following commands. Processing of database 12 is thereby minimized by extracting data relevant to most terrain following flight commands. The subregion 18b is larger in volume, but must be considered in generating terrain profile 40 in the event of unexpected flight path 10 deviation. A relatively smaller volume of database 12, i.e., subregions 18c and 18d, is available to anticipate conditions more distant from aircraft 16.

As aircraft 16 moves along flight path 10 the sample region 18 defines which portions of database 12 are reviewed or sampled for analysis. The subregions 18a–18d thereby change dynamically with respect to database 12 as aircraft 16 moves forward along flight path 10. Thus, at any given time aircraft 16 has available the sample region 18 for analysis in generating terrain profile 40 and executing flight terrain following maneuvers.

A variety of methods of extracting DTED data conforming to sample region 18 may be employed under the present invention. It is contemplated that the extraction of sample region 18 relative to flight path 10 and aircraft 16 be by software implementation. Once the overall dimension criteria for sample region 18 is established, it is considered within the ordinary skill of one in relevant art to extract the sample region 18 and generate a terrain profile 40 according to a given terrain profile transformation algorithm, i.e. convert sample region 18 into terrain profile 40.

By limiting the volume of information extracted from and analyzed under terrain following flight algorithms, the present invention makes terrain following flight more efficient and accurate by considering only those terrain features relevant to the current flight path and potential deviations therefrom. Extraneous portions of DTED database 12 are not extracted and not analyzed. Accordingly, overall computational throughput and memory requirements for the terrain following flight algorithm are substantially reduced in accordance with the present invention without compromising the integrity of the terrain following flight algorithm.

The method of the present invention contemplates generation of a terrain profile which may be used alone, or integrated with short range active sensor data.

When used in conjunction with active sensor data, the active sensors need only be operated at low power settings. As a result, aircraft is visible to hostile forces only within several nautical miles of aircraft position. In this coordinated use, the terrain profile 40 simulates a long range sensor capability for anticipating terrain conditions and dictating long range terrain following flight maneuvers. The active sensors contribute real terrain condition data serving as a short range sensor in the immediate vicinity of the aircraft. Thus, an additional short range terrain profile representing the immediate proximity of the aircraft can be based on active sensor data. The more distant portions of the terrain as represented by terrain profile 40 are based on sample region 18.

The aircraft remains relatively hidden by using low power active sensors, but possesses the tactical advantage of considering terrain conditions at a substantial distance from the aircraft position. Normally, to have the benefit of such long distance terrain profile information, the pilot would have to operate the active sensors at high power and undesirably make the aircraft visible to hostile forces from long distances. Alternatively, a terrain profile could be generated from a DTED database, but such terrain profile generation has, heretofore, been computationally burdensome and not well adapted for dynamic operation, i.e., during flight, due to the volume of data normally extracted for such terrain profile generation. Generation of a terrain profile under the present invention, however, is accomplished at greater speed and, therefore, be more easily integrated into a dynamic in-flight terrain profile generating algorithm.

The method of DTED database analysis of the present invention maximizes safety while allowing lower terrain following flight. In utilizing a preplanned flight route, the present invention capitalizes on a complete knowledge of the mission. When analyzing a predicted route based on aircraft attitude and velocity vectors, the present invention need not be limited by use of active sensor data. Accordingly, the method of the present invention is not limited by a sensor field of view and can consider "hidden terrain", i.e., terrain normally hidden from sensor view. Because the method of the present invention relies primarily on the DTED database 12, all terrain is visible and available for analysis. In contrast, in terrain following systems relying on active sensor data certain terrain is masked by terrain profile, especially when flying at low above ground elevations, and therefore unavailable for anticipating flight maneuvers. Thus, the method of the present invention allows lower average elevation because the aircraft need not travel at relatively higher altitudes to generate a terrain profile by use of active sensor data. The "real" terrain conditions are represented by short range sensor equipment presenting limited risk of visibility to hostile forces. Long range terrain profile information is obtained efficiently, under the present invention, from the DTED data base 12 and is available for complete analysis of upcoming terrain in anticipating terrain following flight maneuvers.

The method of generating a terrain profile under the present invention may take into account a variety of factors including typical pilot response times and particular aircraft information such as response time and flight maneuvering capabilities. The specific mission may be characterized by taking all such parameters into account in selecting the width and length of the various subregions of sample region 18.

The specific dimensions, including length and width for the subregions 18a–18d are generally mission and aircraft specific. It is not considered possible to set forth specific dimensions or formula to calculate dimensions for these subregions. As noted above, each subregion is dimensioned according to expected use of the data. In implementation of the present invention, actual flight data is considered the best method to generate dimensional values for the subregions 18a–18d. Such flight data was obtained by logging aircraft position relative to an expected flight path and analyzing this data to establish criteria for dimensioning the subregions 18a–18d.

For example, by analyzing an actual flight path relative to an expected flight path a statistical deviation from expected flight path may be derived. This statistical deviation could, for example, correlate generally to the subregion 18c and to the subregion 18b. The subregion 18b could then be made larger or smaller relative to this statistical deviation as a function of the magnitude of safety one wishes to incorporate into the terrain profile generating algorithm. If a broad spectrum of unexpected flight path deviating conditions are to be allowed, i.e., a conservative safety margin, the subregion 18b would be correspondingly larger. If, however, the algorithm is to accept a certain degree of risk by not allowing consideration of a broad range of unexpected flight deviating conditions, the subregion 18b could be made correspondingly smaller. The subregion 18d has been found to be effective at the least width magnitude, i.e., a width of one data post 14, as a good indicator of general terrain conditions well in advance of aircraft 16 position.

Thus, it is suggested that actual flight data be employed to generate the dimensional requirements for the subregions 18a–18d. The specific dimensions for these sample subregions may be developed in conjunction with overall mission strategy and safety factors considered. For example, if the aircraft is to execute terrain following flight at extremely high speeds without use of long range active sensor data, the execution time requirements in generating the terrain profile may require that a very small volume of DTED data be used in generating the terrain profile. Conversely, if the aircraft is traveling at slower speeds or aircraft safety is a larger concern, a correspondingly larger dimensioned sample region 18 may be employed to meet these mission specific criteria.

Accordingly, no specific calculation or formula can be provided for general use, but is contemplated that the present invention allow for adjustment in the dimensioning of the sample region 18 to meet such specific criteria, i.e., the sample region 18 is dimensioned according to its expected use and mission specific parameters.

This invention has been described herein in considerable detail in order to comply with the Patent Statutes and to provide those skilled in the art with the information needed to apply the novel principles and to construct and use such specialized components as are required. However, it is to be understood that the invention is not restricted to the particular embodiment that has been described and illustrated, but can be carried out by specifically different equipment and devices, and that various modifications, both as to the equipment details and operating procedures, can be accomplished without departing from the scope of the invention itself.

What is claimed is:

1. A method of generating a terrain profile on an aircraft's flight mission computer system using a sample region of digital terrain elevation data which corresponds to the aircraft's position and predicted flight path, the method comprising the steps:

identifying a plurality of sample regions located directly under and along the predicted flight path of the aircraft, said sample regions varying in dimension according to use criteria including possible short range terrain following commands, potential flight path deviations, and long range terrain following commands; and transforming said plurality of sample regions into a terrain profile, wherein a first sample region is dimensioned according to short range terrain following flight command data needed, a second sample region is dimensioned according to potential flight path deviation data needed, and a third sample region is dimensioned according to long range terrain following flight data needed;

the first sample region being an intermediate volume and closest to the aircraft, the second sample region being a greatest volume and next closest to the aircraft, and the third sample region being a least volume and most distant from the aircraft; and transforming data posts of said first, second, and third sample regions into a terrain profile.

2. The method according to claim 1 wherein each of said plurality of sample regions has a width that varies with respect to other sample regions, and wherein said width among said plurality of sample regions is selected as a function of the aircraft's position along said predicted flight path.

3. A method of generating a terrain profile on an aircraft's flight mission computer system using a sample region of digital terrain elevation data which corresponds to the aircraft's position and predicted flight path, the method comprising the steps:

identifying a plurality of sample regions located directly under and along the predicted flight path of the aircraft, said sample regions varying in dimension according to use criteria including possible short range terrain following commands, potential flight path deviations, and long range terrain following commands; and transforming said plurality of sample regions into a terrain profile, wherein said plurality of sample regions include:

a first sample region having length and width dimensions chosen as a function of data required for execution of terrain following flight commands for terrain in the vicinity of the aircraft;

a second sample region located directly under and along said flight path and in advance of said first sample region relative to said aircraft position, said second sample region having length and width dimension which are directly related to potential flight path deviations caused by unexpected events;

a third sample region with a length and width determined from data required in returning to said flight path from one of said potential flight path deviating conditions; and a fourth sample region located furthest from said aircraft in relation to said first, second, and third sample regions, said fourth sample region having a minimum width dimension relative to the width dimensions of said first, second and third sample regions.

* * * * *